United States Patent
Manoukian et al.

(10) Patent No.: US 10,676,206 B2
(45) Date of Patent: Jun. 9, 2020

(54) SYSTEM AND METHOD FOR HEAT EXCHANGER FAILURE DETECTION

(71) Applicant: PRATT & WHITNEY CANADA CORP., Longueuil (CA)

(72) Inventors: Patrick Manoukian, Saint-Laurent (CA); Robin Watt, Burlington (CA); Amandeep Chahal, Brampton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 269 days.

(21) Appl. No.: 15/835,838

(22) Filed: Dec. 8, 2017

(65) Prior Publication Data

US 2019/0177000 A1    Jun. 13, 2019

(51) Int. Cl.
| | |
|---|---|
| *B64D 37/34* | (2006.01) |
| *B64D 33/08* | (2006.01) |
| *F28F 27/00* | (2006.01) |
| *B64D 41/00* | (2006.01) |
| *B64D 45/00* | (2006.01) |

(52) U.S. Cl.
CPC ............ *B64D 37/34* (2013.01); *B64D 33/08* (2013.01); *F28F 27/00* (2013.01); *B64D 2041/002* (2013.01); *B64D 2045/0085* (2013.01); *F28F 2265/00* (2013.01)

(58) Field of Classification Search
CPC .. B64D 37/34; B64D 33/08; B64D 2041/002; B64D 2045/0085; F28F 27/00; F28F 2265/00

USPC ........................................................ 165/11.1
See application file for complete search history.

(56) References Cited

U.S. PATENT DOCUMENTS

| | | | |
|---|---|---|---|
| 3,080,716 A * | 3/1963 | Cummings | F02C 7/14 60/736 |
| 5,241,814 A * | 9/1993 | Butler | F02C 7/14 60/39.08 |
| 7,693,643 B2 | 4/2010 | Kim et al. | |
| 8,677,755 B2 | 3/2014 | Bulin et al. | |
| 9,766,619 B2 * | 9/2017 | Ziarno | B64D 45/00 |
| 2013/0036722 A1 | 2/2013 | Hashenas et al. | |

FOREIGN PATENT DOCUMENTS

| | | |
|---|---|---|
| CN | 205327441 | 6/2016 |
| CN | 205748926 | 11/2016 |
| GB | 2516080 | 1/2015 |
| RU | 2533597 | 11/2014 |

* cited by examiner

*Primary Examiner* — Joel M Attey
(74) *Attorney, Agent, or Firm* — Norton Rose Fulbright Canada LLP (57) ABSTRACT

A system and a method for detecting a failure of a heat exchanger provided on an engine of an aircraft. An out-of-range fuel temperature downstream of an outlet of the heat exchanger is detected. A health of a fuel tank temperature signal indicative of a temperature of at least one fuel tank of the aircraft is monitored. A main oil temperature signal indicative of a temperature of oil in the engine is received. The failure is detected based on the main oil temperature and on the health of the fuel tank temperature signal.

20 Claims, 7 Drawing Sheets

SYSTEM AND METHOD FOR HEAT EXCHANGER FAILURE DETECTION

TECHNICAL FIELD

The application relates generally to engines and, more particularly, to detection of failure of an engine's heat exchanger.

BACKGROUND OF THE ART

The fuel provided to engines, such as auxiliary power units (APUs), which are typically used to supply electrical or pneumatic power to various aircraft systems, is generally heated by means of a Fuel Oil Heat Exchanger (FOHE). The fuel is indeed circulated in the FOHE, where the heat generated by the engine's oil system is transferred to the fuel.

Excessive or insufficient heating can lead to undesirable effects, such as fuel system fire safety impacts, fuel nozzle coking, or fuel icing (e.g. filter clogging) conditions. In order to monitor the temperature downstream of the outlet (e.g. the health) of the FOHE, existing systems make use of a fuel temperature sensor or a fuel temperature switch. When a fuel temperature switch is used to monitor the health of the FOHE, only a notification as to whether the fuel temperature is outside of a predetermined range is provided. This information is however insufficient to determine if the health of the FOHE or if the fuel temperature switch itself is at fault.

There is therefore a need for an improved system and method for detection of heat exchanger failure.

SUMMARY

In one aspect, there is provided a method for detecting a failure of a heat exchanger provided on an engine of an aircraft, the method comprising detecting an out-of-range fuel temperature downstream of an outlet of the heat exchanger, monitoring a health of a fuel tank temperature signal indicative of a temperature of at least one fuel tank of the aircraft, receiving a main oil temperature signal indicative of a temperature of oil in the engine, and detecting the failure based on the main oil temperature and on the health of the fuel tank temperature signal.

In another aspect, there is provided a system for detecting a failure of a heat exchanger provided on an engine of an aircraft, the system comprising a memory and a processing unit coupled to the memory and configured to detect an out-of-range fuel temperature downstream of an outlet of the heat exchanger, monitor a health of a fuel tank temperature signal indicative of a temperature of at least one fuel tank of the aircraft, receive a main oil temperature signal indicative of a temperature of oil in the engine, and detect the failure based on the main oil temperature and on the health of the fuel tank temperature signal.

In a further aspect, there is provided a non-transitory computer readable medium having stored thereon program code executable by a processor for detecting an out-of-range fuel temperature downstream of an outlet of a heat exchanger provided on an engine of an aircraft, monitoring a health of a fuel tank temperature signal indicative of a temperature of at least one fuel tank of the aircraft, receiving a main oil temperature signal indicative of a temperature of oil in the engine, and detecting the failure based on the main oil temperature and on the health of the fuel tank temperature signal.

DESCRIPTION OF THE DRAWINGS

Reference is now made to the accompanying figures in which.

DETAILED DESCRIPTION

Figure 1:
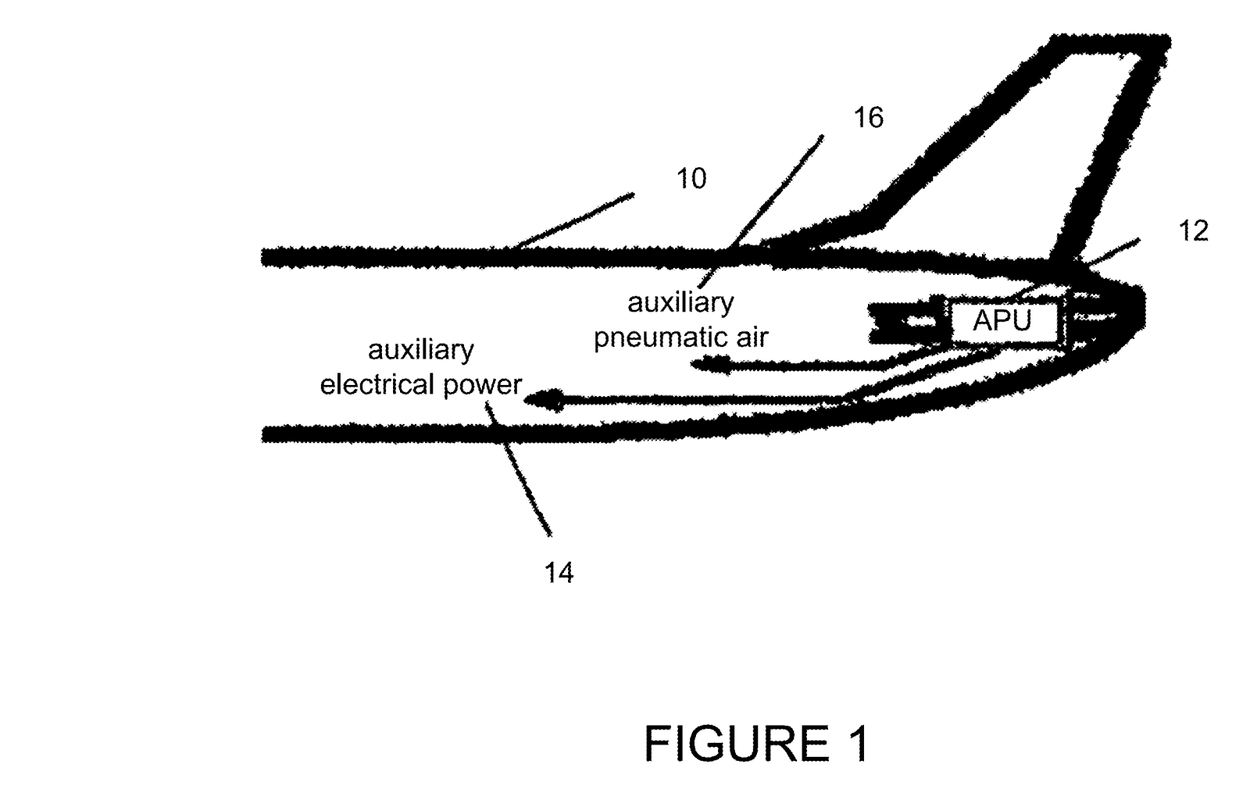
FIG. 1 is a schematic representation of an aircraft including an APU, in accordance with an illustrative embodiment.

Referring to FIG. 1, in one embodiment, an aircraft 10 has mounted thereon an APU 12, which is provided for conventional purposes, including, but not limited to, the provision of electrical power 14 and pneumatic air 16 to the aircraft 10. Among other well-known uses, pneumatic air 16 provided by the APU 12 is used on larger aircraft to provide auxiliary bleed air for starting the aircraft's main engines (not shown).

Figure 2:
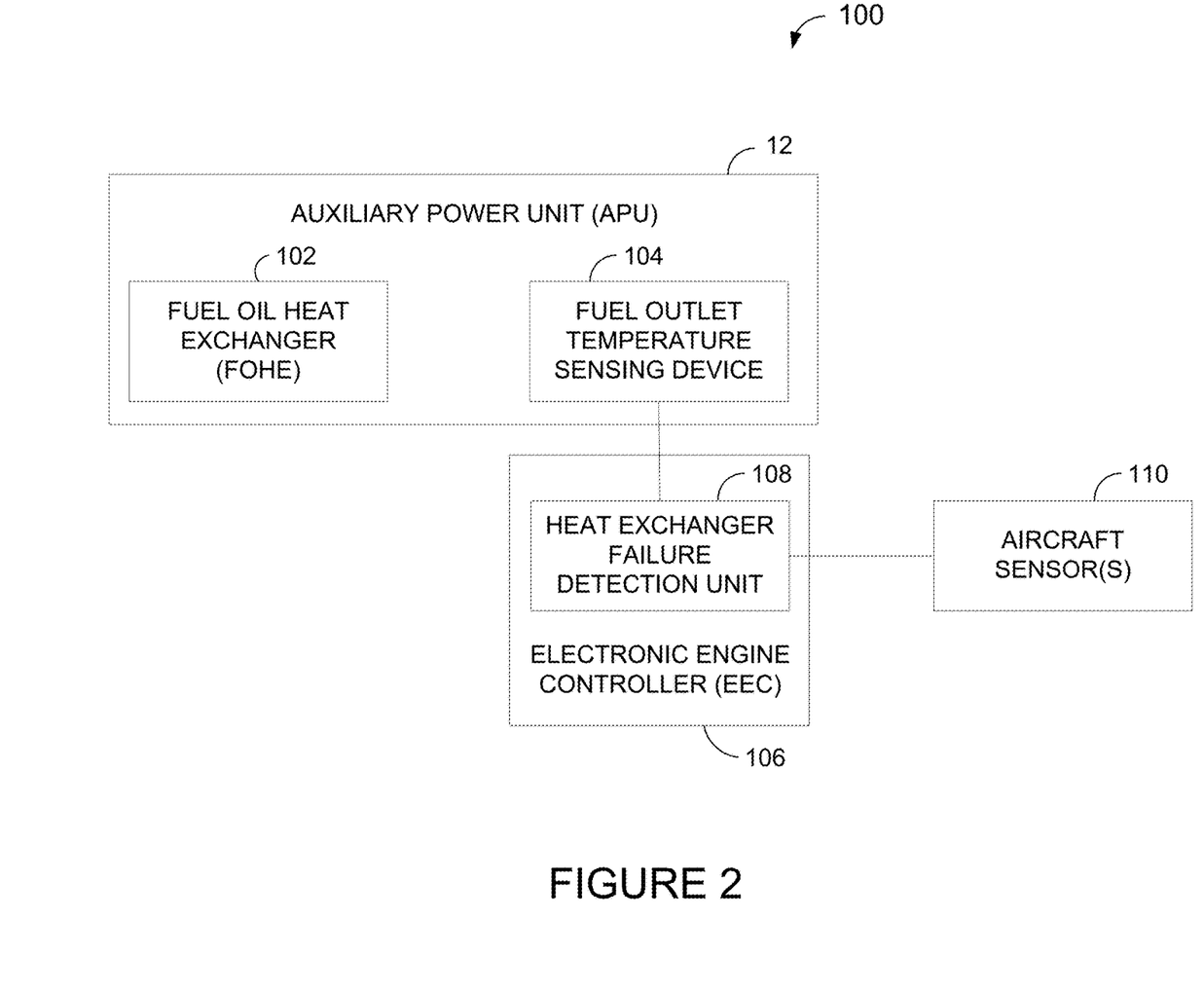
FIG. 2 is a block diagram of a system for heat exchanger failure detection, in accordance with an illustrative embodiment.

FIG. 2 illustrates an example system 100 for heat exchanger failure detection for an engine, such as the APU 12 of FIG. 1. The system 100 is illustratively used to monitor the health of a FOHE 102 and detect any failure (or fault) associated with the FOHE 102. It should however be understood that, although failure detection of a FOHE is discussed and illustrated herein, the proposed system and method may be used to detect failure of various types of heat exchangers including, but not limited to oil and fuel heat exchangers, air-cooled heat exchanger, and fuel-cooled heat exchangers. In particular, the proposed system and method may apply to any heat exchanger where the temperature of the conditioned fluid(s) is not measured. As used herein, the term "conditioned fluid" is intended to include at least one of heated, cooled, and pressurized fluids. As will be understood by one skilled in the art, the engine's thermal management system communicates one or more conditioned fluids to various engine systems in order to minimize heat generation an dissipate the heat generated by the engine during its operation. The inputs and outputs used for each type of heat exchanger (e.g. the parameters used in the proposed system and method) will depend on the source of heat (e.g. heat provided to fuel by oil, air, or the like), the fluid being conditioned, the boundary conditions that influence the performance of the heat exchanger, the input mediums, and the output mediums.

In particular, it is proposed to supplement the information provided by a sensing device 104 (e.g. fuel temperature switch or sensor) that monitors the fuel temperature downstream of the outlet of the FOHE 102 with additional inputs.

In this manner, it becomes possible to reliably detect a failure of the FOHE 102 as well as determine, in the event of such a failure, which of the health of the FOHE 102 and the sensing device 104 itself is at fault (i.e. determine a cause of the FOHE failure). For example, the failure can be due to a general failure of the FOHE 102 or a specific failure of a thermal bypass valve (not shown) of the FOHE 102. Besides detecting normal operation of the FOHE 102, the system and method described herein allow to detect FOHE related faults comprising an insufficient heating condition associated with the FOHE 102, an excessive heating condition associated with the FOHE 102, and a fault of the sensing device 104. Corresponding information is then output, e.g. via a Crew-Alerting System (CAS) message, in order to allow evaluation of the required action(s).

It should be understood that, although the detection system and method are described herein with reference to an APU, other engines for which it may be desirable to detect heat exchanger failure may apply. As will also be understood by those skilled in the relevant arts, the various components of system 100 may be implemented, separately or jointly, in any form or forms suitable for use in implementing the system and method disclosed herein.

As illustrated in FIG. 2, the APU 12 comprises the FOHE 102 and the fuel outlet temperature sensing device 104, which is located downstream of the outlet of the FOHE 102, within the fuel system, and is configured to monitor a fuel temperature downstream of the outlet of the FOHE 102. In one embodiment, the fuel outlet temperature sensing device 104 is a fuel temperature sensor, which acquires accurate measurement(s) of the fuel outlet temperature and provides information regarding the health of the FOHE 102. In other embodiments, the fuel outlet temperature sensing device 104 is a fuel temperature switch, which only provides an indication as to whether the fuel outlet temperature is within a predetermined range (i.e. in-range). For example, the fuel temperature switch is configured to provide a notification when the fuel outlet temperature is outside the predetermined range.

An electronic engine controller (EEC) 106 may be provided to control operation of the APU 12. The EEC 106 sends commands (e.g. in the form of one or more control signal(s)) to the APU 12, which in turn cause the APU 12 to be operated as commanded during normal operation. A heat exchanger failure detection unit 108 may be provided in the EEC 106 for detecting failure of the heat exchanger, e.g. the FOHE 102. For this purpose, the heat exchanger failure detection unit 108 is connected to the fuel outlet temperature sensing device 104 and receives therefrom input data, which may comprise the measurement(s) of the fuel outlet temperature (when a fuel temperature sensor is used as the sensing device 104) or the indication as to whether the fuel outlet temperature is in-range (when a fuel temperature switch is used as the sensing device 104).

The heat exchanger failure detection unit 108 also receives input data from one or more aircraft sensors 110, which are configured to acquire measurements of one or more engine parameters including, but not limited to, a main oil temperature (MOT) indicative of the engine oil temperature and the fuel tank temperature (FTT) indicative of fuel temperature in the aircraft tank(s). The aircraft sensor(s) 110 may also provide the heat exchanger failure detection unit 108 with a measurement of the outside or ambient temperature (OAT), which refers to the static outside temperature without the effects of airspeed. The aircraft sensor(s) may comprise any suitable devices including, but not limited to, a main oil temperature gauge, a fuel tank temperature gauge, and an outside air temperature gauge (calibrated in both degrees Celsius and Fahrenheit). As will be understood by one skilled in the art, the aircraft sensor(s) 110 may be of any mechanical, hydraulic, electrical, magnetic, analog and/or digital compatible form(s) suitable for use in implementing desired embodiments of the system and method disclosed herein.

In some embodiments, the heat exchanger failure detection unit 108 may infer a status of the thermal bypass valve of the FOHE 102. In particular, the heat exchanger failure detection unit 108 may be configured to assess, based on the received input data (e.g. MOT, OAT, measurement(s) of the fuel outlet temperature or indication as to whether the fuel outlet temperature is in-range), whether the thermal bypass valve is stuck open or closed. The assessment may then be used in detecting failure of the FOHE 102, as will be discussed further below.

As will be discussed further below, using the input data received from the fuel outlet temperature sensing device 104, the aircraft sensor(s) 110, and optionally the FOHE 102 itself, the heat exchanger failure detection unit 108 can detect a failure of the FOHE 102 and outputs one or more control signals to provide an indication of the failure, allow evaluation of required action(s), and/or cause implementation of the required action(s). Although the heat exchanger failure detection unit 108 is illustrated herein as being provided in the EEC 106, it should be understood that the control signal(s) indicative of the heat exchanger failure may in some embodiments be provided via aircraft avionics.

Figure 3:
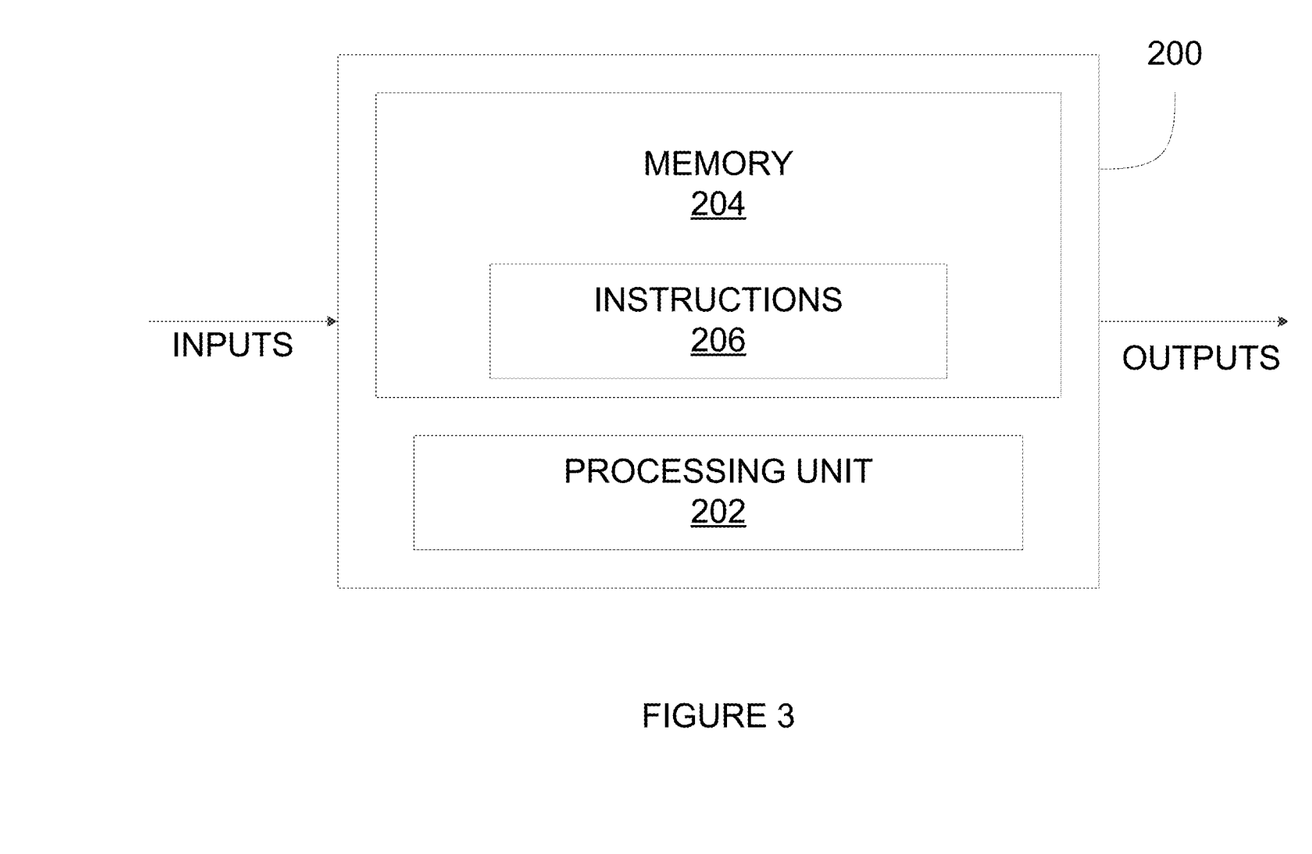
FIG. 3 is a block diagram of a computing device for implementing the electronic engine controller of FIG. 2, in accordance with an illustrative embodiment.

FIG. 3 is an example embodiment of a computing device 200 for implementing the EEC 106 described above with reference to FIG. 2. The computing device 200 comprises a processing unit 202 and a memory 204 which has stored therein computer-executable instructions 206. The processing unit 202 may comprise any suitable devices configured to cause a series of steps to be performed such that instructions 206, when executed by the computing device 200 or other programmable apparatus, may cause the functions/acts/steps specified in the method described herein to be executed. In one embodiment, the processing unit 202 has the ability to interpret discrete inputs and energize discrete outputs. The processing unit 202 may comprise, for example, any type of general-purpose microprocessor or microcontroller, a digital signal processing (DSP) processor, a CPU, an integrated circuit, a field programmable gate array (FPGA), a reconfigurable processor, other suitably programmed or programmable logic circuits, or any combination thereof.

The memory 204 may comprise any suitable known or other machine-readable storage medium. The memory 204 may comprise non-transitory computer readable storage medium, for example, but not limited to, an electronic, magnetic, optical, electromagnetic, infrared, or semiconductor system, apparatus, or device, or any suitable combination of the foregoing. The memory 204 may include a suitable combination of any type of computer memory that is located either internally or externally to device, for example random-access memory (RAM), read-only memory (ROM), electro-optical memory, magneto-optical memory, erasable programmable read-only memory (EPROM), and electrically-erasable programmable read-only memory (EEPROM), Ferroelectric RAM (FRAM) or the like. Memory 204 may comprise any storage means (e.g., devices) suitable for retrievably storing machine-readable instructions 206 executable by processing unit 202.

Figure 4:
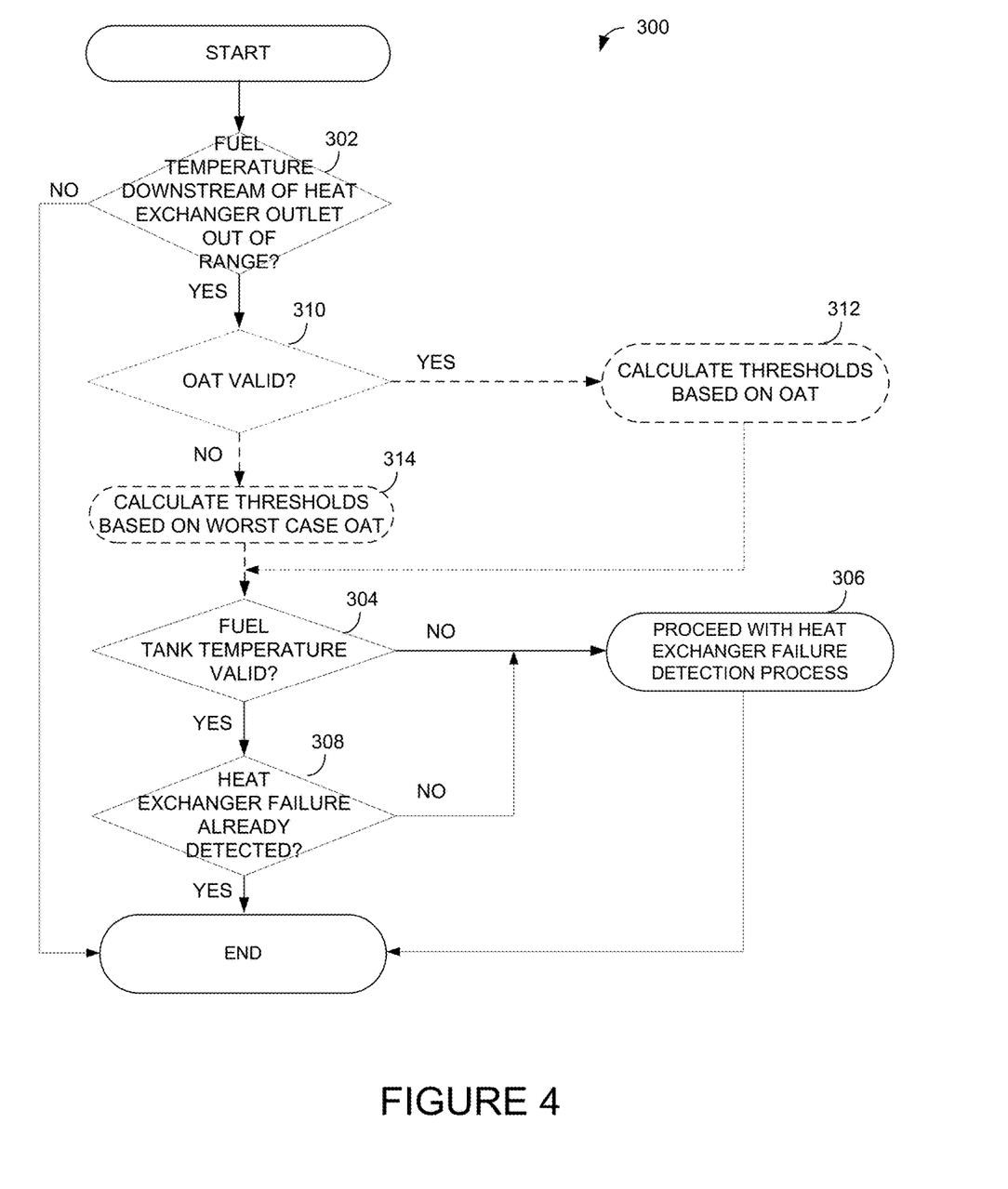
FIG. 4 is a flowchart of a method for heat exchanger failure detection, in accordance with an illustrative embodiment.

Referring now to FIG. 4, an example method 300 for fuel oil heat exchanger failure detection will now be described.

The method 300 may be implemented by the computing device 200 of FIG. 3. The method 300 comprises assessing at step 302 whether a fuel temperature downstream of the heat exchanger outlet is out of range. The assessment performed at step 302 may be directly obtained from an indication received from a fuel temperature switch configured to monitor the heat exchanger's health. Alternatively, when a fuel temperature sensor is used to monitor the heat exchanger's health, step 302 may comprise comparing receiving from the fuel temperature sensor a measurement of the fuel temperature, comparing the measurement received from the fuel temperature sensor to at least one predetermined threshold (e.g. a preset or desired temperature range) and determining based on a result of the comparison whether the fuel temperature is out of range. In one embodiment, the at least one predetermined threshold is 80 degrees Fahrenheit. It should be understood that other suitable thresholds or ranges may apply, depending on engine configuration and/or characteristics. It should also be understood that the fuel outlet temperature may be monitored dynamically in real time, regularly in accordance with a predetermined interval, or irregularly.

If it is determined at step 302 that the fuel temperature downstream of the outlet of the heat exchanger is not out of range, the method 300 ends. Otherwise, if it is determined at step 302 that the fuel temperature downstream of the outlet of the heat exchanger is out of range (e.g. is beyond the desired temperature range), the next step 304 is to assess whether the fuel tank temperature is valid, i.e. whether the fuel tank temperature signal is compromised or not. In one embodiment, the fuel tank temperature signal is considered compromised if the fuel tank temperature measurement is erroneous. In another embodiment, the fuel tank temperature signal is considered compromised if no fuel tank temperature signal is received (i.e. the signal is missing and not providing data). It should be understood that the fuel tank temperature signal may be monitored dynamically in real time, regularly in accordance with a predetermined interval, or irregularly. In some embodiments, the method 300 further comprises monitoring the health of the MOT signal in addition to monitoring the health of the fuel tank temperature signal. In this case, heat exchanger failure detection is inhibited if the MOT signal is compromised (in other words heat exchanger failure detection is only performed provided the MOT signal is healthy).

If it is determined at step 304 that the fuel tank temperature is invalid, the next step 306 is to proceed with the heat exchanger failure detection process. Otherwise, if the fuel tank temperature is valid, the next step 308 is to assess whether a heat exchanger failure has already been detected. If this is the case, the method 300 ends as the heat exchanger failure detection method and system described herein illustratively only allow to detect one fault at a time (i.e. the heat exchanger related faults discussed above are mutually exclusive). In other words, once a given heat exchanger related fault is detected (e.g. latched), the remaining heat exchanger related faults are inhibited such that redundant faults (e.g. both an excessive heating condition and a fault of the sensing device) are not detected. If no heat exchanger failure has been detected to date, the method 300 flows to the step 306 of proceeding with the heat exchanger failure detection process.

Figure 5:
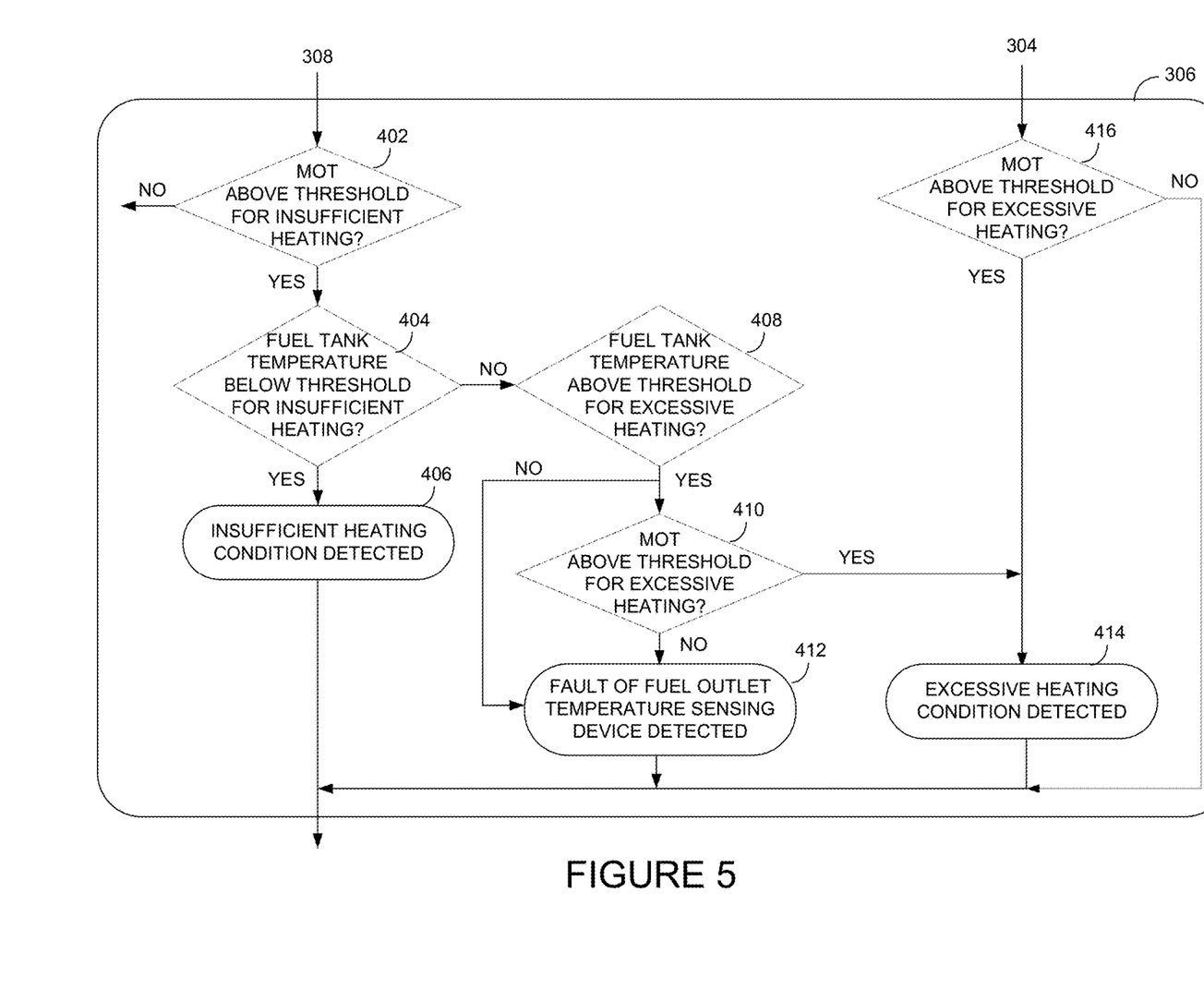
FIG. 5 is a flowchart of the step of FIG. 4 of proceeding with a heat exchanger failure detection process.

Referring now to FIG. 5 in addition to FIG. 4, in one embodiment, step 306 of proceeding with the heat exchanger failure detection process comprises, after it has been determined at step 308 that no heat exchanger failure has been detected to date, assessing whether the MOT is above a first (or MOT) threshold associated with an insufficient heating condition of the heat exchanger (step 402). If this is not the case, the method 300 ends and no heat exchanger fault is detected (e.g. the method 300 concludes to normal operation of the engine). Otherwise, the next step 404 is to determine whether the fuel tank temperature is below (e.g. lower than) a second (or FTT) threshold associated with the insufficient heating condition. If this is the case, the insufficient heating condition of the heat exchanger is detected (e.g. latched) at step 406.

If it is determined at step 404 that the fuel tank temperature is not below (e.g. is greater than or equal to) the threshold for insufficient heating, the next step 408 is to determine whether the fuel tank temperature is above a first (or FTT) threshold associated with an excessive heating condition of the heat exchanger. If this is the case, the next step 410 is to determine whether the MOT is above a second (or MOT) threshold associated with the excessive heating condition. If this is not the case or it is determined at step 408 that the fuel tank temperature is not above the first threshold for excessive heating, a fault of the heat exchanger fuel outlet temperature sensing device is detected (e.g. latched) at step 412. For example, the sensing device fault is detected if a fuel temperature switch fault is set (e.g. the switch is stating an out of range temperature) while the fuel tank temperature and the MOT are not in the ranges to detect excessive or insufficient heating.

In one embodiment, the first and second thresholds for insufficient heating have different values and the first and second thresholds for excessive heating also have different values. The thresholds are illustratively set depending on engine configuration and/or characteristics and may be determined by test and/or analysis (e.g. extreme climate test data). For example, the fuel tank temperature and MOT inputs may be analyzed in a typical engine mission profile in order to predict conditions where the expected fuel temperature at the heat exchanger outlet is above a maximum operational limit in the event of a malfunctioning heat exchanger. The thresholds may be adjusted to account for MOT sensor and signal accuracy as well as heat exchanger performance variability. Thermal variation in the engine's fuel system lines may also be considered in determining the fuel tank temperature threshold(s). In one embodiment, the thresholds are generated using a mathematical model representing the engine thermal management system. For example, a steady state oil system model specific for the engine may be used. The model may then be used to run various scenarios (e.g. excessive heating, insufficient heating) to find the threshold values. In particular, for various inputs affecting the thermal system, the mathematical model is used to determine ranges of key input mediums and output mediums that may be used to qualify the indication of the heat exchanger temperature sensing device for insufficient heating or excessive heating, in addition to the validity of the temperature sensing device itself. It should therefore be understood that the values of the MOT threshold associated with an insufficient heating condition, the FTT threshold associated with the insufficient heating condition, the MOT threshold associated with the excessive condition, and the FTT threshold associated with the excessive condition may vary depending on engine configuration and requirements.

If it is determined at step 410 that the MOT is above the second threshold associated with the excessive heating condition, the excessive heating condition of the heat exchanger is detected (e.g. latched) at step 414. The excessive heating condition is also detected at step 414 after it has been determined that the fuel tank temperature is invalid (step 304) and that the MOT is above the second threshold for excessive heating (step 416). In other words, if the fuel tank temperature is not available, only the excessive heating condition will be monitored for a given MOT minimum value. If it is determined that the fuel tank temperature is invalid (step 304) but the MOT is not above the second threshold for excessive heating (step 416), the method 300 ends.

In the embodiment described and illustrated herein, the OAT measurement is included in the selection of the MOT threshold(s). This may allow to minimize processor utilization and therefore reduce computational power. It should however be understood that, in an alternate embodiment, the OAT may be directly provided as an additional input parameter that is used in the computation of heat exchanger failure regions. In this manner, the precision of the failure condition selection (e.g. of the threshold computation) can be improved and more accurate and less conservative heat exchanger failure detection may be achieved. For example, and as illustrated in FIG. 4, responsive to determining that the fuel temperature at the heat exchanger's outlet is out of range (step 302) and prior to assessing whether the fuel tank temperature is valid (step 304), the method 300 may determine whether the OAT is valid (step 310), i.e. whether the OAT signal is compromised or not. In one embodiment, the OAT signal is considered compromised if the fuel tank temperature measurement is erroneous. In another embodiment, the OAT signal is considered compromised if no OAT signal is received (i.e. the signal is missing and not providing data). It should be understood that the OAT signal may be monitored dynamically in real time, regularly in accordance with a predetermined interval, or irregularly. If it is determined at step 310 that the OAT is valid, the MOT and Fuel Tank thresholds for excessive and insufficient heating are calculated based on the OAT (step 312). If the OAT is invalid, the MOT and Fuel Tank thresholds for excessive and insufficient heating are calculated at step 314 based on a worst-case OAT (e.g. a predefined value).

In yet another embodiment, the method 300 may determine a status of the thermal bypass valve of the heat exchanger in order to detect the heat exchanger failure. This may allow to increase the functionality of the fuel temperature sensing device and it should be understood that the status of the thermal bypass valve may be used to supplement or replace the MOT and/or the fuel tank temperature input data.

Figure 6:
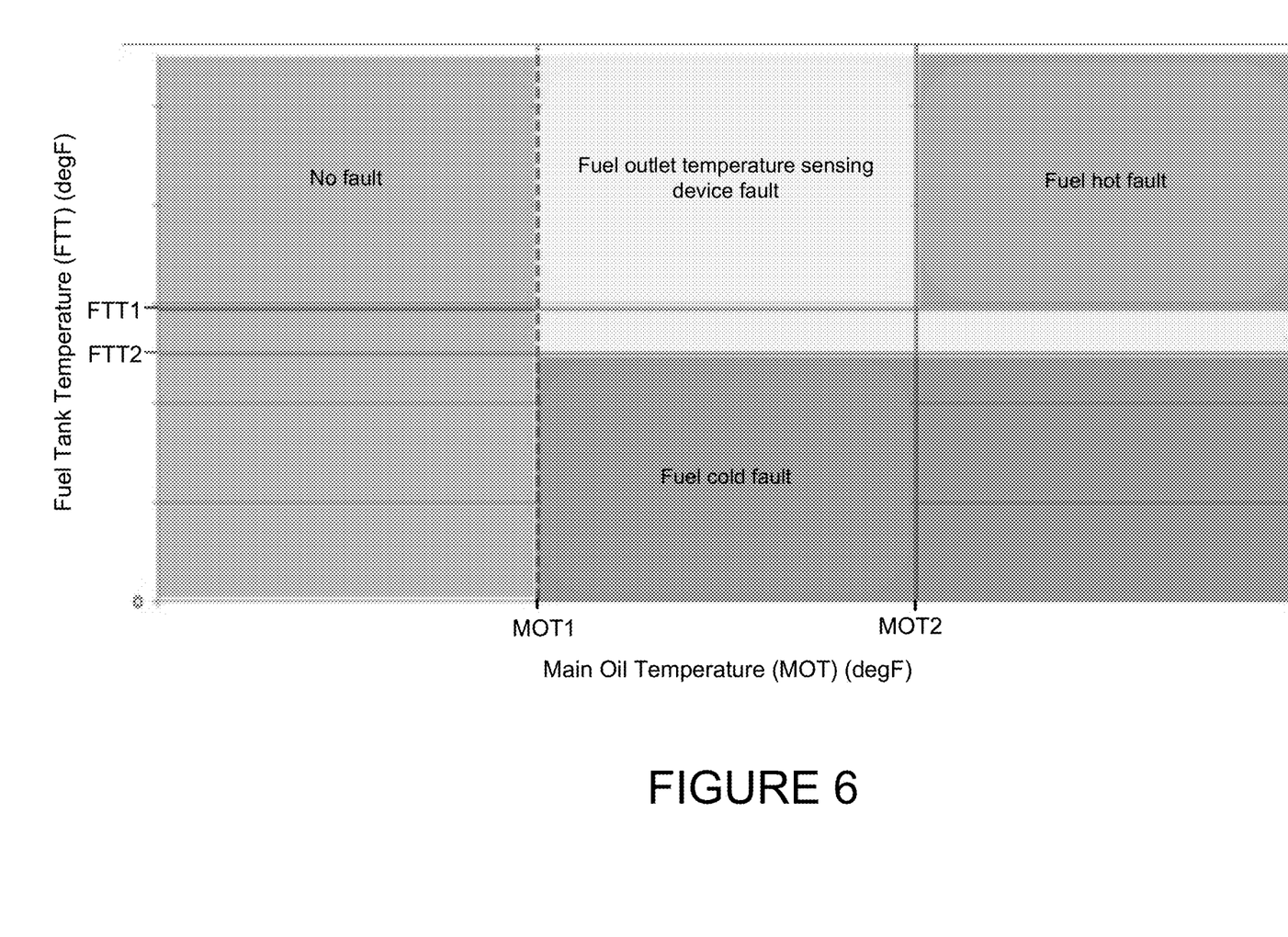
FIG. 6 is a plot of main oil temperature versus fuel tank temperature identifying various heat exchanger failure regions, when the fuel tank temperature signal and the main oil temperature signal are valid, in accordance with one embodiment.

FIG. 6 illustrates a plot of MOT versus FTT with various heat exchanger failure regions, when both the fuel tank temperature and the main oil temperature signals are healthy (i.e. valid). It can be seen that when the MOT is below the first threshold for insufficient heating (labeled MOT1 in FIG. 6), no heat exchanger failure detection occurs (labeled "No fault" in FIG. 6). When the MOT is above the first threshold for insufficient heating (MOT1) and the FTT is below the second threshold for insufficient heating (labeled FTT2 in FIG. 6), the insufficient heating condition (labeled "Fuel cold fault" in FIG. 6) is detected. When the MOT is above the second threshold for excessive heating (labeled MOT2 in FIG. 6) and the FTT is above the first threshold for excessive heating (labeled FTT1 in FIG. 6), the excessive heating condition (labeled "Fuel hot fault" in FIG. 6) is detected. When the MOT is above the first threshold for insufficient heating (MOT1) and the FTT is between the first threshold for excessive heating (FTT1) and the second threshold for insufficient heating (FTT2), failure of the heat exchanger fuel outlet temperature sensing device is detected. Failure of the heat exchanger fuel outlet temperature sensing device may also be detected when the FTT is above the second threshold for insufficient heating (FTT2) and the MOT is between the first threshold for insufficient heating (MOT1) and the second threshold for excessive heating (MOT2). Corresponding information (e.g. a CAS message indicative of the detected failure) may be output.

Figure 7:
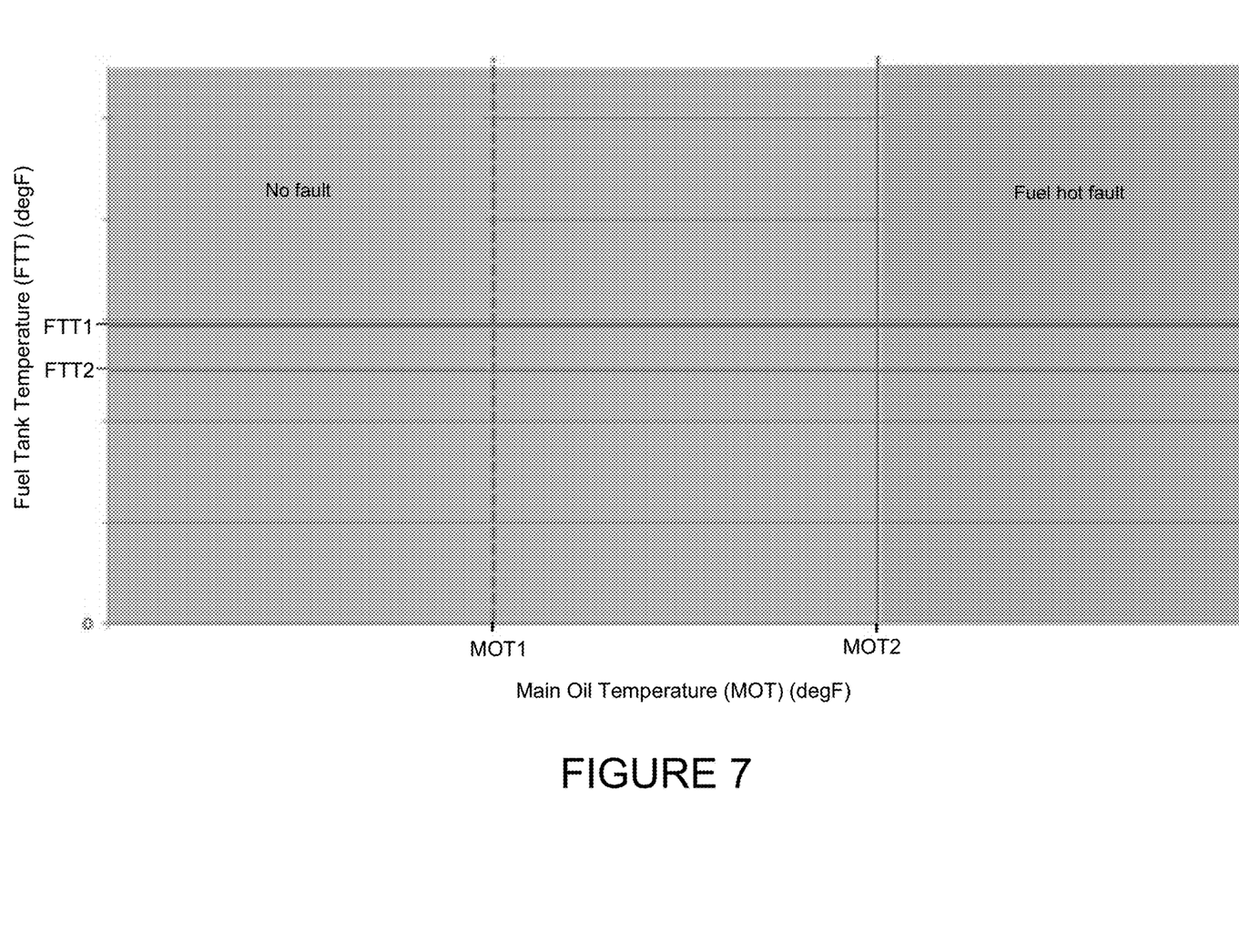
FIG. 7 is a plot of main oil temperature versus fuel tank temperature identifying a heat exchanger excessive heating region, when the fuel tank temperature signal is compromised and the main oil temperature signal is valid, in accordance with one embodiment.

FIG. 7 illustrates a plot 600 of MOT versus FTT with various heat exchanger failure regions, when the main oil temperature signal is healthy and the fuel tank temperature signal is compromised (i.e. invalid). It can be seen that when the MOT is below the first threshold for insufficient heating (labeled MOT1 in FIG. 7), no heat exchanger failure detection occurs. When the MOT is above the second threshold for excessive heating (MOT2), the excessive heating condition (labeled "Fuel hot fault" in FIG. 7) is detected and corresponding information (e.g. a CAS message) may be output The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A method for detecting a failure of a heat exchanger provided on an engine of an aircraft, the method comprising:
   detecting an out-of-range fuel temperature downstream of an outlet of the heat exchanger;
   monitoring a health of a fuel tank temperature signal indicative of a temperature of at least one fuel tank of the aircraft;
   receiving a main oil temperature signal indicative of a temperature of oil in the engine; and
   detecting the failure based on the main oil temperature and on the health of the fuel tank temperature signal.

2. The method of claim 1, wherein detecting the out-of-range fuel outlet temperature comprises:
   receiving the input data from a fuel temperature sensor, the input data comprising a measurement of a temperature of fuel downstream of the outlet of the heat exchanger;
   comparing the input data to a predetermined temperature range; and
   detecting the out-of-range fuel outlet temperature responsive to determining that the temperature of fuel downstream of the outlet of the heat exchanger is outside the range.

3. The method of claim 1, further comprising receiving the input data from a fuel temperature switch, the input data comprising an indication that a temperature of fuel downstream of the outlet of the heat exchanger is outside a predetermined temperature range.

4. The method of claim 1, wherein detecting the failure comprises detecting one of an excessive heating condition of the heat exchanger, an insufficient heating condition of the heat exchanger, and a failure of a sensing device configured to monitor a temperature of fuel downstream of the outlet of the heat exchanger.

5. The method of claim 4, wherein monitoring the health of the fuel tank temperature signal comprises detecting that the fuel tank temperature signal is compromised and further wherein detecting the excessive heating condition comprises detecting that the main oil temperature exceeds a threshold associated with the excessive heating condition.

6. The method of claim 4, wherein monitoring the health of the fuel tank temperature signal comprises detecting that the fuel tank temperature signal is healthy and further wherein detecting the excessive heating condition comprises detecting that the main oil temperature exceeds a first threshold associated with the excessive heating condition and detecting that the fuel tank temperature exceeds a second threshold associated with the excessive heating condition.

7. The method of claim 4, wherein monitoring the health of the fuel tank temperature signal comprises detecting that the fuel tank temperature signal is healthy and further wherein detecting the insufficient heating condition comprises detecting that the main oil temperature exceeds a first threshold associated with the insufficient heating condition and detecting that the fuel tank temperature is below a second threshold associated with the insufficient heating condition.

8. The method of claim 4, wherein monitoring the health of the fuel tank temperature signal comprises detecting that the fuel tank temperature signal is healthy and further wherein detecting the failure of the sensing device comprises detecting that the fuel tank temperature exceeds a first threshold associated with the excessive heating condition and that the main oil temperature exceeds a threshold associated with the insufficient heating condition and below a second threshold associated with the excessive heating condition.

9. The method of claim 4, wherein monitoring the health of the fuel tank temperature signal comprises detecting that the fuel tank temperature signal is healthy and further wherein detecting the failure of the sensing device comprises detecting that the fuel tank temperature exceeds a first threshold associated with the insufficient heating condition and is below a threshold associated with the excessive heating condition and detecting that the main oil temperature exceeds a second threshold associated with the insufficient heating condition.

10. The method of claim 1, further comprising monitoring a health of the main oil temperature signal, wherein the failure is detected provided the main oil temperature signal is healthy.

11. A system for detecting a failure of a heat exchanger provided on an engine of an aircraft, the system comprising:
a memory; and
a processing unit coupled to the memory and configured to:
detect an out-of-range fuel temperature downstream of an outlet of the heat exchanger;
monitor a health of a fuel tank temperature signal indicative of a temperature of at least one fuel tank of the aircraft;
receive a main oil temperature signal indicative of a temperature of oil in the engine; and
detect the failure based on the main oil temperature and on the health of the fuel tank temperature signal.

12. The system of claim 11, wherein the processing unit is configured to detect the out-of-range fuel outlet temperature comprising:
receiving input data from a fuel temperature sensor, the input data comprising a measurement of a temperature of fuel downstream of the outlet of the heat exchanger;
comparing the input data to a predetermined temperature range; and
detecting the out-of-range fuel outlet temperature responsive to determining that the temperature of fuel downstream of the outlet of the heat exchanger is outside the range.

13. The system of claim 11, wherein the processing unit is configured to receive input data from a fuel temperature switch, the input data comprising an indication that a temperature of fuel downstream of the outlet of the heat exchanger is outside a predetermined temperature range.

14. The system of claim 11, wherein the processing unit is configured to detect one of an excessive heating condition of the heat exchanger, an insufficient heating condition of the heat exchanger, and a failure of a sensing device configured to monitor a temperature of fuel downstream of the outlet of the heat exchanger.

15. The system of claim 14, wherein the processing unit is configured to detect that the fuel tank temperature signal is compromised and to detect the excessive heating condition comprising detecting that the main oil temperature exceeds a threshold associated with the excessive heating condition.

16. The system of claim 14, wherein the processing unit is configured to detect that the fuel tank temperature signal is healthy and to detect the excessive heating condition comprising detecting that the main oil temperature exceeds a first threshold associated with the excessive heating condition and detecting that the fuel tank temperature exceeds a second threshold associated with the excessive heating condition.

17. The system of claim 14, wherein the processing unit is configured to detect that the fuel tank temperature signal is healthy and to detect the insufficient heating condition comprising detecting that the main oil temperature exceeds a first threshold associated with the insufficient heating condition and detecting that the fuel tank temperature is below a second threshold associated with the insufficient heating condition.

18. The system of claim 14, wherein the processing unit is configured to detect that the fuel tank temperature signal is healthy and to detect the failure of the sensing device comprising detecting that the fuel tank temperature exceeds a first threshold associated with the excessive heating condition and that the main oil temperature exceeds a threshold associated with the insufficient heating condition and below a second threshold associated with the excessive heating condition.

19. The system of claim 14, wherein the processing unit is configured to detect that the fuel tank temperature signal is healthy and to detect the failure of the sensing device comprising detecting that the fuel tank temperature exceeds a first threshold associated with the insufficient heating condition and is below a threshold associated with the excessive heating condition and detecting that the main oil temperature exceeds a second threshold associated with the insufficient heating condition.

20. A non-transitory computer readable medium having stored thereon program code executable by a processor for:
detecting an out-of-range fuel temperature downstream of an outlet of a heat exchanger provided on an engine of an aircraft;
monitoring a health of a fuel tank temperature signal indicative of a temperature of at least one fuel tank of the aircraft;
receiving a main oil temperature signal indicative of a temperature of oil in the engine; and detecting the failure based on the main oil temperature and on the health of the fuel tank temperature signal.

* * * * *